(12) United States Patent
Hwang et al.

(10) Patent No.: US 10,400,865 B2
(45) Date of Patent: Sep. 3, 2019

(54) MULTI-STAGE TRANSMISSION FOR VEHICLE

(71) Applicant: HYUNDAI MOTOR COMPANY, Seoul (KR)

(72) Inventors: Seong Wook Hwang, Gunpo-si (KR); Jae Chang Kook, Hwaseong-si (KR); Hyu Tae Shim, Hwaseong-si (KR); Seong Wook Ji, Ansan-si (KR); Won Min Cho, Hwaseong-si (KR); Kang Soo Seo, Yongin-si (KR); Myeong Hoon Noh, Seongnam-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 15/934,689

(22) Filed: Mar. 23, 2018

(65) Prior Publication Data
US 2018/0209515 A1 Jul. 26, 2018

Related U.S. Application Data

(62) Division of application No. 14/884,562, filed on Oct. 15, 2015, now Pat. No. 9,958,034.

(30) Foreign Application Priority Data

Mar. 13, 2015 (KR) .................. 10-2015-0034772

(51) Int. Cl.
*F16H 3/66* (2006.01)

(52) U.S. Cl.
CPC ....... *F16H 3/66* (2013.01); *F16H 2200/0065* (2013.01); *F16H 2200/2012* (2013.01); *F16H 2200/2046* (2013.01); *F16H 2200/2097* (2013.01)

(58) Field of Classification Search
CPC ..... F16H 2200/2012; F16H 2200/2046; F16H 2200/2097; F16H 3/66
See application file for complete search history.

(56) References Cited

U.S. PATENT DOCUMENTS

| | | | |
|---|---|---|---|
| 8,303,455 B2 | 11/2012 | Gumpoltsberger et al. | |
| 9,587,716 B1* | 3/2017 | Park | F16H 3/66 |
| 2010/0210400 A1 | 8/2010 | Phillips et al. | |
| 2011/0045939 A1 | 2/2011 | Gumpoltsberger et al. | |
| 2011/0045943 A1 | 2/2011 | Gumpoltsberger et al. | |
| 2012/0172173 A1 | 7/2012 | Wittkopp et al. | |
| 2013/0090206 A1 | 4/2013 | Mellet et al. | |
| 2017/0002901 A1* | 1/2017 | Kook | F16H 3/66 |
| 2017/0108088 A1* | 4/2017 | Ji | F16H 3/66 |
| 2017/0114866 A1* | 4/2017 | Oh | F16H 3/66 |

(Continued)

FOREIGN PATENT DOCUMENTS

DE 10 2009 052 148 A1 5/2011
WO 2013/088900 A1 6/2013

*Primary Examiner* — Stacey A Fluhart
(74) *Attorney, Agent, or Firm* — Brinks Gilson & Lione

(57) ABSTRACT

A multi-stage transmission for a vehicle is provided that has at least nine forward shifting stages and one reverse shifting stage with a relatively small number of parts and a configuration such that an engine may be operated at desired operation points, thereby increasing fuel efficiency of the vehicle, and the engine may be operated more quietly, thereby improving the quietness of the vehicle.

7 Claims, 2 Drawing Sheets

(56) References Cited

U.S. PATENT DOCUMENTS

| | | | |
|---|---|---|---|
| 2017/0152920 A1* | 6/2017 | Kwon | F16H 3/66 |
| 2017/0159769 A1* | 6/2017 | Ji | F16H 3/66 |
| 2017/0159772 A1* | 6/2017 | Cho | F16H 3/66 |
| 2018/0298989 A1* | 10/2018 | Kook | F16H 3/62 |
| 2018/0363731 A1* | 12/2018 | Kook | F16H 3/66 |
| 2019/0078663 A1* | 3/2019 | Hwang | F16H 3/666 |
| 2019/0120335 A1* | 4/2019 | Kook | F16H 3/66 |

* cited by examiner

| Shifting stage | CL1 | CL2 | CL3 | CL4 | B1 | B2 | Gear ratio |
|---|---|---|---|---|---|---|---|
| 1ST |  | O | O |  |  | O | 5.160 |
| 2ND | O | O |  |  |  | O | 3.033 |
| 3RD | O |  | O |  |  | O | 2.062 |
| 4TH |  |  | O | O |  | O | 1.570 |
| 5TH | O |  | O | O |  |  | 1.225 |
| 6TH | O | O |  | O |  |  | 1.000 |
| 7TH |  | O | O | O |  |  | 0.862 |
| 8TH |  | O |  | O | O |  | 0.720 |
| 9TH |  |  | O | O | O |  | 0.606 |
| REV |  |  | O |  | O | O | −4.518 |

| Shifting stage | CL1 | CL2 | CL3 | CL4 | B1 | B2 | Gear ratio |
|---|---|---|---|---|---|---|---|
| 1ST | | O | O | | | O | 5.160 |
| 2ND | O | O | | | | O | 3.033 |
| 3RD | O | | O | | | O | 2.062 |
| 4TH | | | O | O | | O | 1.570 |
| 5TH | O | | O | O | | | 1.225 |
| 6TH | O | O | | O | | | 1.000 |
| 7TH | | O | O | O | | | 0.862 |
| 8TH | | O | | O | O | | 0.720 |
| 9TH | | | O | O | O | | 0.606 |
| REV | | | O | | O | O | -4.518 |

MULTI-STAGE TRANSMISSION FOR VEHICLE

CROSS-REFERENCE TO RELATED APPLICATIONS

This application is a divisional application of non-provision U.S. patent application Ser. No. 14/884,562, filed on Oct. 15, 2015, which claims priority to and the benefit of Korean Patent Application No. 10-2015-0034772, filed on Mar. 13, 2015, the entirety of each of which are hereby incorporated by reference.

FIELD

The present disclosure generally relates to a multi-stage transmission for a vehicle.

BACKGROUND

The statements in this section merely provide background information related to the present disclosure and may not constitute prior art.

Recent rising oil prices have driven worldwide car manufacturers into unlimited competition to improve fuel efficiency. In addition, great efforts have been made to reduce the weight and improve the fuel efficiency of engines based on a variety of techniques such as downsizing, and similar measures.

Meanwhile, among methods utilized for transmissions equipped in vehicles to improve fuel efficiency, there is a method allowing an engine to operate at more efficient operation points using the multi-staging of a transmission, thereby improving the fuel efficiency.

Further, such the multi-staging of a transmission allows an engine to operate in a relatively low RPM (revolutions per minute) range.

However, as the number of shifting stages of a transmission increases, the number of internal parts constituting the transmission also increases. This may lead to undesirable effects instead, such as the reduced mountability and transfer efficiency and the increased cost and weight of the transmission

SUMMARY

The present disclosure provides a multi-stage transmission for a vehicle that has at least nine forward shifting stages and one reverse shifting stage with a relatively small number of parts and a simple configuration such that an engine may be operated at desired operation points, thereby providing an improvement in the fuel efficiency of the vehicle, and the engine may be operated more quietly, thereby improving the quietness of the vehicle.

According to one form of the present disclosure, there is provided a multi-stage transmission for a vehicle including: an input shaft; an output shaft; a first to fourth planetary gear devices disposed between the input shaft and the output shaft to transmit rotary force. Each of the first to fourth planetary gear devices has three rotary elements, and at least six shifting elements connected to the rotary elements of the planetary gear devices. A first rotary element of the first planetary gear device may be installed to be fixed, a second rotary element of the first planetary gear device may stay connected to a third rotary element of the second planetary gear device, and a third rotary element of the first planetary gear device may be variably connected to a second rotary element of the second planetary gear device and stays connected to a first rotary element of the third planetary gear device and a first rotary element of the fourth planetary gear device. A first rotary element of the second planetary gear device may be variably connected to the input shaft, and the second rotary element of the second planetary gear device may be installed to be selectively fixable by one shifting element of the at least six shifting elements and variably connected to the input shaft. A second rotary element of the third planetary gear device may stay connected to the output shaft, and a third rotary element of the third planetary gear device may be installed to be selectively fixable by another of the at least six shifting elements. A second rotary element of the fourth planetary gear device may be configured to be selectively connected to the input shaft, and a third rotary element of the fourth planetary gear device may be configured to secure a state at least even temporarily connected to the output shaft.

According to another aspect of the present disclosure, the multi-stage transmission includes a first to fourth planetary gear devices having three rotary elements, respectively; six shifting elements configured to variably provide frictional force; and a first to eighth rotary shafts connected to the rotary elements of the first to fourth planetary gear devices. The first rotary shaft may be an input shaft. The second rotary shaft may be directly connected to a second rotary element of the second planetary gear device. The third rotary shaft may be directly connected to a second rotary element of the first planetary gear device and a third rotary element of the second planetary gear device. The fourth rotary shaft may be directly connected to a third rotary element of the first planetary gear device, a first rotary element of the third planetary gear device and a first rotary element of the fourth planetary gear device. The fifth rotary shaft may be directly connected to a first rotary element of the second planetary gear device. The sixth rotary shaft may be directly connected to a third rotary element of the third planetary gear device. The seventh rotary shaft may be a second rotary element of the fourth planetary gear device. And the eighth rotary shaft may be an output shaft directly connected to a second rotary element of the third planetary gear device and a third rotary element of the fourth planetary gear device. The six shifting elements may include first to fourth clutches and first and second brakes. The first clutch may be disposed between the first rotary shaft and the second rotary shaft. The second clutch may be disposed between the second rotary shaft and the fourth rotary shaft. The third clutch may be disposed between the first rotary shaft and the fifth rotary shaft. The fourth clutch may be disposed between the first rotary shaft and the seventh rotary shaft. The first brake may be disposed between the second rotary shaft and a transmission case, and the second brake may be disposed between the sixth rotary shaft and the transmission case.

According to still another aspect of the present disclosure, is a multi-stage transmission for a vehicle including a first to fourth planetary gear devices having three rotary elements, respectively. Six shifting elements configured to variably provide frictional force, and a first to eighth rotary shafts connected to the rotary elements of the first to fourth planetary gear devices. The first rotary shaft may be an input shaft. The second rotary shaft may be directly connected to a second rotary element of the second planetary gear device. The third rotary shaft may be directly connected to a second rotary element of the first planetary gear device and a third rotary element of the second planetary gear device. The fourth rotary shaft may be directly connected to a third rotary element of the first planetary gear device, a first rotary element of the third planetary gear device and a first rotary element of the fourth planetary gear device. The fifth rotary shaft may be directly connected to a first rotary element of the second planetary gear device. The sixth rotary shaft may be directly connected to a third rotary element of the third planetary gear device. The seventh rotary shaft may be directly connected to a third rotary element of the fourth planetary gear device. The eighth rotary shaft may be an output shaft directly connected to a second rotary element of the third planetary gear device. The six shifting elements may include first to fourth clutches and first and second brakes. The first clutch may be disposed between the first rotary shaft and the second rotary shaft. The second clutch may be disposed between the second rotary shaft and the fourth rotary shaft. The third clutch may be disposed between the first rotary shaft and the fifth rotary shaft. The fourth clutch may be disposed between the seventh rotary shaft and the eighth rotary shaft. The first brake may be disposed between the second rotary shaft and a transmission case, and the second brake may be disposed between the sixth rotary shaft and the transmission case.

According to the present disclosure, as set forth above, the multi-stage transmission for a vehicle can realize at least nine forward shifting stages and one reverse shifting stage with a relatively small number of parts and a configuration such that the engine may be operated at desired operation points, thereby maximizing an improvement in the fuel efficiency of the vehicle, and the engine may be operated more quietly, thereby improving the quietness of the vehicle.

Further areas of applicability will become apparent from the description provided herein. It should be understood that the description and specific examples are intended for purposes of illustration only and are not intended to limit the scope of the present disclosure

DRAWINGS

In order that the disclosure may be well understood, there will now be described various forms thereof, given by way of example, reference being made to the accompanying drawings, in which.

DETAILED DESCRIPTION

Figures 1, 2:
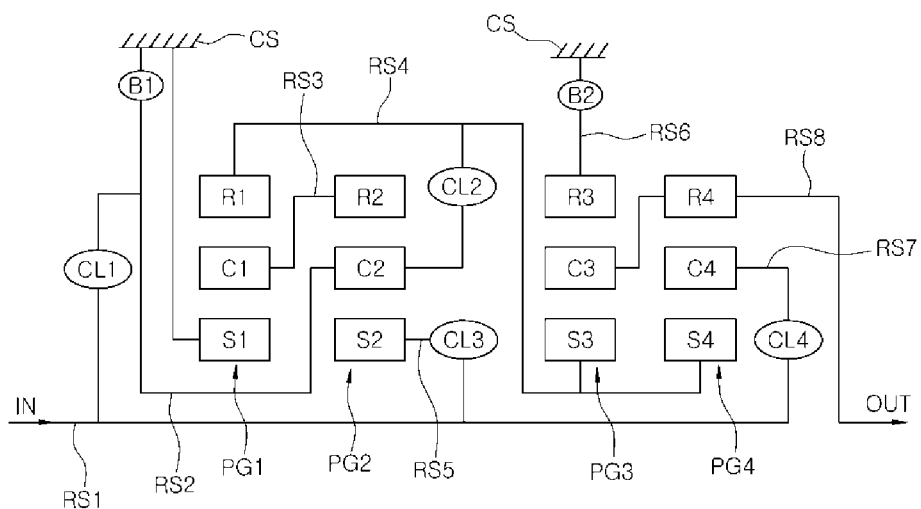
FIG. 1 is a diagram illustrating the configuration of a multi-stage transmission for a vehicle according to one form of the present disclosure.
FIG. 2 illustrates an operation mode table of the transmission shown in FIG. 1.

The following description is merely exemplary in nature and is not intended to limit the present disclosure, application, or uses. It should be understood that throughout the drawings, corresponding reference numerals indicate like or corresponding parts and features.

A multi-stage transmission for a vehicle according to a first and second exemplary embodiments of the present invention may commonly include an input shaft "IN"; an output shaft "OUT"; a first to fourth planetary gear devices "PG1", "PG2", "PG3" and "PG4" disposed between the input shaft "IN" and the output shaft "OUT" to transmit rotary force, each of the first to fourth planetary gear devices PG1, PG2, PG3 and PG4 has three rotary elements, and at least six shifting elements, e.g. clutches CL1-CL6, connected to rotary elements of the first to fourth planetary gear devices PG1-PG4.

A first rotary element S1 of the first planetary gear device PG1 may be selectively fixed to a transmission case CS. A second rotary element C1 of the first planetary gear device PG1 may stay connected to a third rotary element R2 of the second planetary gear device PG2. A third rotary element R1 of the first planetary gear device PG1 may be variably connected, (i.e., is selectively, intermittently connected) to a second rotary element C2 of the second planetary gear device PG2 and stays connected to a first rotary element S3 of the third planetary gear device PG3 and a first rotary element S4 of the fourth planetary gear device PG4.

A first rotary element S2 of the second planetary gear device PG2 may be variably connected to the input shaft IN, and the second rotary element C2 of the second planetary gear device PG2 may be installed to be selectively fixable by one shifting element of the at least six shifting elements and variably connected to the input shaft IN.

A second rotary element C3 of the third planetary gear device PG3 may stay connected to the output shaft OUT, and a third rotary element R3 of the third planetary gear device PG3 may be installed to be selectively fixable by another shifting element of the at least six shifting elements.

A second rotary element C4 of the fourth planetary gear device PG4 may be configured to be selectively connected to the input shaft IN, and a third rotary element R4 of the fourth planetary gear device PG4 may be configured to secure a state at least even temporarily connected to the output shaft OUT.

The first planetary gear device PG1, the second planetary gear device PG2, the third planetary gear device PG3 and the fourth planetary gear device PG4 may be sequentially arranged along the axial direction of the input shaft IN and the output shaft OUT.

The second rotary element C2 of the second planetary gear device PG2 may be installed to be selectively fixable to a transmission case CS by means of a first brake B1 from among the at least six shifting elements. The third rotary element R3 of the third planetary gear device PG3 may be installed to be selectively fixable to the transmission case CS by means of a second brake B2 from among the at least six shifting elements.

Therefore, the first brake B1 and the second brake B2 function as brakes, respectively, such that the second rotary element C2 of the second planetary gear device PG2 and the third rotary element R3 of the third planetary gear device PG3 may be in a rotatable state, or in a restrained state, not able to rotate by means of the operations of the first brake B1 and the second brake B2, respectively.

The other shifting elements from among the at least six shifting elements may be configured to constitute variable connection structures between the rotary elements of the planetary gear devices and between the rotary elements of the planetary gear devices and the input shaft IN.

The configurations described above form the common configurations of the first form and the second form. In the first form shown in FIG. 1, the second rotary element C4 of the fourth planetary gear device PG4 may be variably connected to the input shaft IN by still another of the at least six shifting elements, and the third rotary element R4 of the fourth planetary gear device PG4 may stay connected to the output shaft OUT.

That is, the first clutch CL1 from among the at least six shifting elements may form a variable connection structure between the second rotary element C2 of the second planetary gear device PG2 and the input shaft IN. The second clutch CL2 from among the at least six shifting elements may form a variable connection structure between the third rotary element R1 of the first planetary gear device PG1 and the second rotary element C2 of the second planetary gear device PG2. The third clutch CL3 from among the at least six shifting elements may form a variable connection structure between the first rotary element S2 of the second planetary gear device PG2 and the input shaft IN. The fourth clutch CL4 from among the at least six shifting elements may form a variable connection structure between the second rotary element C4 of the fourth planetary gear device PG4 and the input shaft IN.

Figures 3, 4:
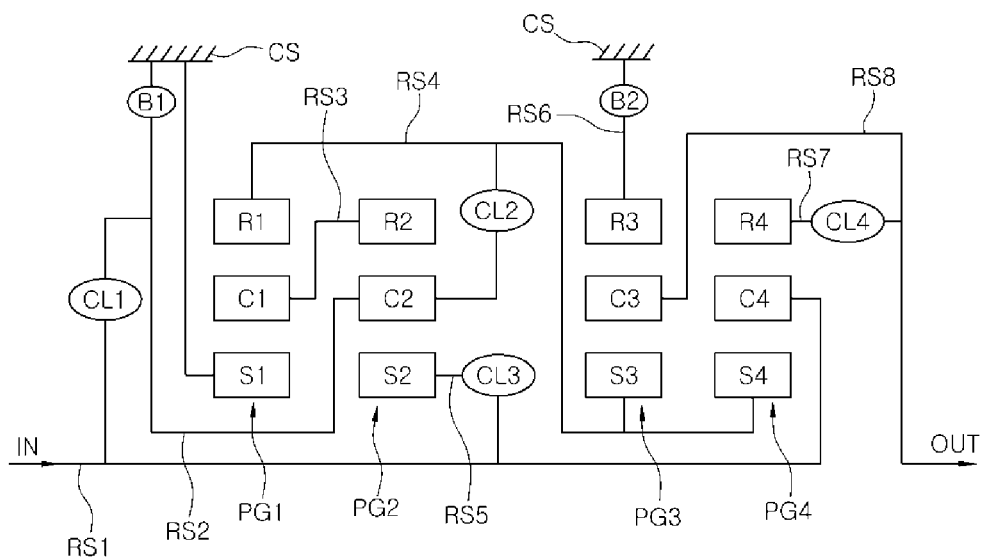
FIG. 3 is a diagram illustrating the configuration of a multi-stage transmission for a vehicle according to another form of the present disclosure.
FIG. 4 illustrates an operation mode table of the transmission shown in FIG. 3.

Meanwhile, in the second exemplary embodiment shown in FIG. 3, the second rotary element C4 of the fourth planetary gear device PG4 may stay connected to the input shaft IN, and the third rotary element R4 of the fourth planetary gear device PG4 may be variably connected to the output shaft OUT by still another shifting element of the at least six shifting elements.

That is, the first clutch CL1 from among the at least six shifting elements may form a variable connection structure between the second rotary element C2 of the second planetary gear device PG2 and the input shaft IN. The second clutch CL2 from among the at least six shifting elements may form a variable connection structure between the third rotary element R1 of the first planetary gear device PG1 and the second rotary element C2 of the second planetary gear device PG2. The third clutch CL3 from among the at least six shifting elements may form a variable connection structure between the first rotary element S2 of the second planetary gear device PG2 and the input shaft IN. The fourth clutch CL4 from among the at least six shifting elements may form a variable connection structure between the second rotary element C3 of the third planetary gear device PG3 and the third rotary element R4 of the fourth planetary gear device PG4. As a result, the third rotary element R4 of the fourth planetary gear device PG4 is to be variably connected to the output shaft OUT.

In the first and second exemplary embodiments, the first rotary element S1, the second rotary element C1 and the third rotary element R1 of the first planetary gear device PG1 are a first sun gear, a first carrier and a first ring gear, respectively. The first rotary element S2, the second rotary element C2 and the third rotary element R2 of the second planetary gear device PG2 are a second sun gear, a second carrier and a second ring gear, respectively. The first rotary element S3, the second rotary element C3 and the third rotary element R3 of the third planetary gear device PG3 are a third sun gear, a third carrier and a third ring gear, respectively. The first rotary element S4, the second rotary element C4 and the third rotary element R4 of the fourth planetary gear device PG4 are a fourth sun gear, a fourth carrier and a fourth ring gear, respectively.

The forms of the transmission configured as above may also be presented as follows. Specifically, the multi-stage transmission for a vehicle according to the one form of the present disclosure may include the first to fourth planetary gear devices PG1, PG2, PG3, and PG4 each having three rotary elements, the six shifting elements configured to variably provide frictional force, and the eight rotary shafts connected to the rotary elements of the first to fourth planetary gear devices.

Hence, from among the eight rotary shafts, the first rotary shaft RS1 may be the input shaft IN. The second rotary shaft RS2 may be directly connected to the second rotary element C2 of the second planetary gear device PG2. The third rotary shaft RS3 may be directly connected to the second rotary element C1 of the first planetary gear device PG1 and the third rotary element R2 of the second planetary gear device PG2. The fourth rotary shaft RS4 may be directly connected to the third rotary element R1 of the first planetary gear device PG1, the first rotary element S3 of the third planetary gear device PG3 and the first rotary element S4 of the fourth planetary gear device PG4. The fifth rotary shaft RS5 may be directly connected to the first rotary element S2 of the second planetary gear device PG2. The sixth rotary shaft RS6 may be directly connected to the third rotary element R3 of the third planetary gear device PG3. The seventh rotary shaft RS7 may be directly connected to the second rotary element C4 of the fourth planetary gear device PG4. The eighth rotary shaft RS8 may be the output shaft OUT directly connected to the second rotary element C3 of the third planetary gear device PG3 and the third rotary element R4 of the fourth planetary gear device PG4.

In addition, from among the six shifting elements, the first clutch CL1 may be disposed between the first rotary shaft RS1 and the second rotary shaft RS2. The second clutch CL2 may be disposed between the second rotary shaft RS2 and the fourth rotary shaft RS4. The third clutch CL3 may be disposed between the first rotary shaft RS1 and the fifth rotary shaft RS5. The fourth clutch CL4 may be disposed between the first rotary shaft RS1 and the seventh rotary shaft RS7. The first brake B1 may be disposed between the second rotary shaft RS2 and the transmission case CS. The second brake B2 may be disposed between the sixth rotary shaft RS6 and the transmission case CS.

Meanwhile, the multi-stage transmission for a vehicle according to the second form of the present disclosure may include the first to fourth planetary gear devices PG1, PG2, PG3, and PG4 each have three rotary elements; the six shifting elements configured to variably provide frictional force, and the eight rotary shafts connected to the rotary elements of the first to fourth planetary gear devices.

Hence, from among the eight rotary shafts, the first rotary shaft RS1 may be the input shaft IN. The second rotary shaft RS2 may be directly connected to the second rotary element C2 of the second planetary gear device PG2. The third rotary shaft RS3 may be directly connected to the second rotary element C1 of the first planetary gear device PG1 and the third rotary element R2 of the second planetary gear device PG2. The fourth rotary shaft RS4 may be directly connected to the third rotary element R1 of the first planetary gear device PG1, the first rotary element S3 of the third planetary gear device PG3 and the first rotary element S4 of the fourth planetary gear device PG4. The fifth rotary shaft RS5 may be directly connected to the first rotary element S2 of the second planetary gear device PG2. The sixth rotary shaft RS6 may be directly connected to the third rotary element R3 of the third planetary gear device PG3. The seventh rotary shaft RS7 may be directly connected to the third rotary element R4 of the fourth planetary gear device PG4. The eighth rotary shaft RS8 may be the output shaft OUT directly connected to the second rotary element C3 of the third planetary gear device PG3.

In addition, from among the six shifting elements, the first clutch CL1 may be disposed between the first rotary shaft RS1 and the second rotary shaft RS2. The second clutch CL2 may be disposed between the second rotary shaft RS2 and the fourth rotary shaft RS4. The third clutch CL3 may be disposed between the first rotary shaft RS1 and the fifth rotary shaft RS5. The fourth clutch CL4 may be disposed between the seventh rotary shaft RS7 and the eighth rotary shaft RS8. The first brake B1 may be disposed between the second rotary shaft RS2 and the transmission case CS. The second brake B2 may be disposed between the sixth rotary shaft RS6 and the transmission case CS.

As set forth above, the multi-stage transmission for a vehicle according to the present disclosure includes the four planetary gear devices PG1, PG2, PG3, PG4 and the six shifting elements configured to form nine forward shifting stages and one reverse shifting stage according to the operation mode table, as illustrated in FIG. 2 and FIG. 4, respectively. Since the multi-stage transmission is configured to form nine shifting stages and the high gear efficiency of a planetary gear for each shifting stage can reach 98.8% a relatively small number of parts and a simple configuration, the multi-stage transmission for a vehicle can contribute to the improved fuel efficiency and quietness of a vehicle, thereby ultimately improving the marketability of the vehicle.

Forms described may be changed or modified by those skilled in the art to which the present disclosure pertains without departing from the scope of the present disclosure, and various alterations and modifications are possible within the technical spirit of the present disclosure and the equivalent scope of the claims which will be described below.

What is claimed is:

1. A multi-stage transmission for a vehicle, comprising:
an input shaft;
an output shaft;
a first, second, third, and fourth planetary gear devices disposed between the input shaft and the output shaft to transmit rotary force, each of the first, second, third and fourth planetary gear devices having three rotary elements; and
at least six shifting elements connected to the rotary elements of the planetary gear devices, the at least six shifting elements including first, second, third, fourth, fifth and sixth shifting elements;
wherein a first rotary element of the first planetary gear device is fixed, a second rotary element of the first planetary gear device stays connected to a third rotary element of the second planetary gear device, and a third rotary element of the first planetary gear device is variably connected to a second rotary element of the second planetary gear device and stays connected to a first rotary element of the third planetary gear device and a first rotary element of the fourth planetary gear device;
wherein a first rotary element of the second planetary gear device is variably connected to the input shaft, and the second rotary element of the second planetary gear device is installed to be selectively fixable by the fifth shifting element of the at least six shifting elements and variably connected to the input shaft;
wherein a second rotary element of the third planetary gear device stays connected to the output shaft, and a third rotary element of the third planetary gear device is installed to be selectively fixable by the sixth shifting element of the at least six shifting elements;
wherein a second rotary element of the fourth planetary gear device is variably connected to the input shaft by the fourth shifting element, and a third rotary element of the fourth planetary gear device stays connected to the output shaft.

2. The multi-stage transmission according to claim 1, wherein the first planetary gear device, the second planetary gear device, the third planetary gear device and the fourth planetary gear device are sequentially arranged along an axial direction of the input shaft and the output shaft.

3. The multi-stage transmission according to claim 2, wherein:
the second rotary element of the second planetary gear device is installed to be selectively fixable to a transmission case by the fifth shifting element, the fifth shifting element being a first brake,
the third rotary element of the third planetary gear device is installed to be selectively fixable to the transmission case by the sixth shifting element, the sixth shifting element being a second brake, and
the other shifting elements of the at least six shifting elements are configured to constitute variable connection structures between the rotary elements of the planetary gear devices and between the rotary elements of the planetary gear devices and the input shaft.

4. The multi-stage transmission according to claim 3, wherein:
the first shifting element is a first clutch configured to form a variable connection structure between the second rotary element of the second planetary gear device and the input shaft,
the second shifting element is a second clutch configured to form a variable connection structure between the third rotary element of the first planetary gear device and the second rotary element of the second planetary gear device,
the third shifting element is a third clutch configured to form a variable connection structure between the first rotary element of the second planetary gear device and the input shaft, and
the fourth shifting element is a fourth clutch configured to form a variable connection structure between the second rotary element of the fourth planetary gear device and the input shaft.

5. A multi-stage transmission for a vehicle comprising:
a first, second, third, and fourth planetary gear devices having three rotary elements, respectively;
six shifting elements configured to variably provide frictional force; and
a first, second, third, fourth, fifth, sixth, seventh and eighth rotary shafts connected to the rotary elements of the first, second, third and fourth planetary gear devices,
wherein the first rotary shaft is an input shaft, the second rotary shaft is connected to a second rotary element of the second planetary gear device, the third rotary shaft is connected to a second rotary element of the first planetary gear device and a third rotary element of the second planetary gear device, the fourth rotary shaft is connected to a third rotary element of the first planetary gear device, a first rotary element of the third planetary gear device and a first rotary element of the fourth planetary gear device, the fifth rotary shaft is connected to a first rotary element of the second planetary gear device, the sixth rotary shaft is connected to a third rotary element of the third planetary gear device, the seventh rotary shaft is directly connected to a second rotary element of the fourth planetary gear device, and the eighth rotary shaft is an output shaft directly connected to a second rotary element of the third planetary gear device and a third rotary element of the fourth planetary gear device; and
wherein the six shifting elements include a first to fourth clutches and a first and second brakes, the first clutch is disposed between the first rotary shaft and the second rotary shaft, the second clutch is disposed between the second rotary shaft and the fourth rotary shaft, the third clutch is disposed between the first rotary shaft and the fifth rotary shaft, the fourth clutch is disposed between the first rotary shaft and the seventh rotary shaft, the first brake is disposed between the second rotary shaft and a transmission case, and the second brake is disposed between the sixth rotary shaft and the transmission case.

6. The multi-stage transmission according to claim 5, wherein the first planetary gear device, the second planetary gear device, the third planetary gear device and the fourth planetary gear device are sequentially arranged along an axial direction of the input shaft and the output shaft.

7. The multi-stage transmission according to claim 5, wherein:
- a first clutch from among the at least six shifting elements forms a variable connection structure between the second rotary element of the second planetary gear device and the input shaft,
- a second clutch from among the at least six shifting elements forms a variable connection structure between the third rotary element of the first planetary gear device and the second rotary element of the second planetary gear device,
- a third clutch from among the at least six shifting elements forms a variable connection structure between the first rotary element of the second planetary gear device and the input shaft, and
- a fourth clutch from among the at least six shifting elements forms a variable connection structure between the second rotary element of the fourth planetary gear device and the input shaft.

\* \* \* \* \*